United States Patent Office

2,739,140
COLOR STABILIZATION PROCESS FOR POLYMERS CONTAINING ACRYLONITRILE

Raymond M. Price, Midland, and Arthur F. Roche, Freeland, Mich., assignors to The Dow Chemical Company, Midland, Mich., a corporation of Delaware No Drawing. Application December 1, 1951, Serial No. 259,478

7 Claims. (Cl. 260—80.5)

This invention relates to a process for color stabilization of binary and ternary polymers of acrylonitrile and alkenyl aromatic hydrocarbons.

When a polymer of acrylonitrile and an alkenyl aromatic hydrocarbon is obtained from the mass polymerization of the corresponding monomers, a pronounced darkening or discoloring of the polymerized product is commonly observed especially at polymerization temperatures above 120° C. This darkening is accompanied by a change in other physical properties of the polymeric product and is assumed to be an evidence of partial decomposition. Because of the many desirable properties of polymers containing acrylonitrile, a means is sought to overcome or to prevent the tendency for such polymers to decompose at higher polymerization temperatures. Temperatures above 120° C. are necessary, however, to polymerize such monomeric starting materials completely.

It is an object of this invention to provide a process whereby monomeric acrylonitrile and alkenyl aromatic hydrocarbons may be mass polymerized into colorless binary or ternary polymers. Another object is to provide certain heat stabilizers which, when incorporated in small amounts in the monomeric mixture, will prevent or minimize darkening and discoloration in the copolymer product at polymerization temperatures above 120° C. Other objects will be apparent from the following description of the invention.

According to the present invention the above objects are accomplished by a polymerization process for the manufacture of binary or ternary polymers of acrylonitrile and alkenyl aromatic hydrocarbons at polymerization temperatures between 80° and 200° C. in the substantial absence of an inert liquid medium in which a small amount of a heat stabilizer is incorporated in the monomeric mixture to prevent discoloration upon prolonged exposure to temperatures above 120° C. The process is especially useful in making binary and ternary polymers containing from 20 to 40 per cent by weight of acrylonitrile. Binary polymers of acrylonitrile and styrene or alpha-methyl styrene and ternary polymers of these three constituents may be produced in substantially colorless condition by the new process.

The heat stabilizer to be employed in the process of the present invention may be any compound which generates water vapor at temperatures between 100° and 200° C. without combustion, the only by-products, if any, being volatile oxides of carbon. Examples of such compounds are water, formic acid, glyoxylic acid and oxalic acid. Formic acid and glyoxylic acid give water and carbon monoxide, on decomposition. Oxalic acid gives water, carbon dioxide and carbon monoxide. About 0.1 to 1 per cent by weight of the heat stabilizer is incorporated in the polymerization mixture when temperatures above 120° C. are employed.

In order to illustrate more clearly the manner in which this invention may be carried out, the following examples are cited but it is to be understood that many variations may be effected without departing from the scope of the invention.

EXAMPLE 1

A cylindrical vessel was filled with a mixture of 25 pounds of acrylonitrile, 32 pounds of styrene, 32 pounds of alpha-methyl styrene and 0.9 pound of unsaturated dimers of alpha-methyl styrene, and 0.2 per cent by weight of crystalline oxalic acid ($C_2H_2O_4 \cdot 2H_2O$). The vessel was sealed, and the mixture was subjected to the following schedule of temperature conditions: 16 hours at 85° C.; 24 hours at 80° C.; 48 hours at 75° C.; 72 hours at 70° C.; 24 hours at 85° C.; 48 hours at 95° C.; and 48 hours at 160° C., then cooled. The container was stripped from the solid block of polymer and the polymer was crushed to a granular form. Portions of the polymeric product were compression molded to form flat plates having a thickness of 0.4 inch. These plates were used to determine a color characteristic for the polymer. The procedure in determining the color characteristic was to measure the per cent of light having wave lengths between 420 millimicrons and 620 millimicrons which was transmitted through a test plate. The difference between the per cent of light transmitted at the respective wave lengths divided by the per cent of light transmitted at a wave length of 620 millimicrons represents the per cent yellowness in the polymeric product. The per cent yellowness increases with darkening of the color of the polymer. Other portions of the polymeric product were injection molded to form test bars of 1/8 x 1/2 inch rectangular cross section by 4 inches long. These test bars were used to determine the tensile strength in pounds per square inch of original cross section, the per cent of its original length by which the product could be elongated under tension before breakage occurred and the impact strength in foot-pounds of energy per inch of notch applied as a sharp blow to cause breakage of a test bar. The procedures in determining the tensile strength and per cent elongation were similar to those described in A. S. T. M. D638-44T. The procedure in measuring impact strength was similar to that described in A. S. T. M. D256-44T. A portion of the polymeric product was tested to determine the proportion of volatile material therein. The procedure in determining the proportion of volatile material was to weigh a portion of the polymeric product, then heat it in vacuum at 213° C. and at 1 millimeter absolute pressure for 20 minutes, then cool and re-weigh. The loss in weight represents volatile ingredients. Other molded test pieces were used to determine the heat distortion temperature by a procedure of Heirholzer and Boyer, A. S. T. M. Bulletin No. 134 of May, 1945. For purpose of comparison a mixture of acrylonitrile, styrene, alpha-methyl styrene and the unsaturated dimers of alpha-methyl styrene in the same proportions, was polymerized under the same time and temperature conditions, but in the absence of any oxalic acid or other source of water vapor, and the polymeric product was tested as just described. The properties determined for the respective polymers were as follows:

| | A | B |
|---|---|---|
| Oxalic acid, percent | none | 0.2 |
| Color (percent yellow) | 97.8 | 35.9 |
| Tensile strength, pounds per square inch | 10,270 | 11,080 |
| Notched impact strength, ft. pounds | 0.232 | 0.292 |
| Elongation, percent | 2.4 | 3.1 |
| Volatiles, percent | 2.57 | 2.95 |
| Heat Distortion Temp., ° C | 86 | 84 |

EXAMPLE 2

Ninety pounds of a mixture consisting of 26 per cent by weight of acrylonitrile, 36.5 per cent of styrene, 36.5 per cent of alpha-methyl styrene, 0.8 per cent of liquid unsaturated dimers of alpha-methyl styrene and 0.2 per cent of an aqueous solution containing 90 per cent by weight of formic acid, was polymerized by heating the same in a closed container which had been flushed out with nitrogen previous to monomer addition. Polymerization was carried out in accordance with the schedule of time and temperature conditions described in Example 1. The polymeric product was tested as described in the preceding example. The results were as follows:

| | |
|---|---|
| Color (% yellow) | 26.4 |
| Tensile strength, pounds per square inch | 10,770 |
| Notched impact strength, ft. pounds | 0.294 |
| Elongation, per cent | 2.9 |
| Volatiles, per cent | ---- |
| Heat distortion temp., °C | 79 |

EXAMPLE 3

A mixture of 45 grams of acrylonitrile, 52.5 grams of styrene and 52.5 grams of alpha-methyl styrene, together with 0.45 gram of crystalline oxalic acid and a 1/8-inch diameter iron rod 4 inches long was sealed in a glass tube having an internal diameter of one and one-half inches and a length of 12 inches, with air occupying the free space in the tube. The mixture was polymerized by heating the same in the sealed tube in accordance with the following schedule of time and temperature conditions: 120 hours at 100° C.; 17 hours at 150° C.; 8 hours at 175° C.; and 16 hours at 200° C. The tube was cooled and the polymer was removed and crushed to a granular form. A portion of the product was dissolved in toluene to form a solution containing 10 per cent by weight of the material at 25° C. This solution was used to determine a color characteristic for the polymer. For purpose of comparison a mixture of acrylonitrile, styrene and alpha-methyl styrene in the same proportions was polymerized under the same time and temperature conditions, except in the absence of oxalic acid, and the yellowness of the polymer was similarly determined. The results are given in the following table:

Table I

| Run No. | Percent Oxalic Acid | Yellowness, percent |
|---|---|---|
| 1 | 0.3 | 58.4 |
| 2 | none | 80.9 |

It is to be noted from the above examples that the mechanical properties of the heat stabilized polymer are, in all instances, improved over the blank polymer. In every case the blank exhibited a significant discoloration or darkening in contrast to the stabilized polymer.

Improved color characteristics have similarly been attained in binary polymers containing 20 to 40 per cent by weight of acrylonitrile and correspondingly 80 to 60 per cent of styrene or α-methyl styrene and ternary polymers containing 20 to 40 per cent by weight of acrylonitrile and 80 to 60 per cent of a mixture of styrene and α-methyl styrene in all proportions, by incorporating in the monomeric mixture 0.1 to 1 per cent by weight of water, formic acid, glyoxylic acid or oxalic acid prior to polymerization at temperatures above 120° C.

We claim:

1. In a mass polymerization process for making a solid polymer consisting only of from 20 to 40 per cent by weight of acrylonitrile and from 80 to 60 per cent of at least one alkenyl aromatic hydrocarbon from the group consisting of styrene and α-methyl styrene, wherein the monomeric starting materials are heated to polymerization temperatures between 80° and 200° C., the improvement which consists in mixing with the monomeric starting materials from 0.1 to 1 per cent by weight of a stabilizing compound from the group consisting of oxalic acid, glyoxylic acid and formic acid, and effecting at least a part of the polymerization for a substantial time at temperatures above 120° C.

2. The process as claimed in claim 1 wherein at least part of the alkenyl aromatic hydrocarbon is styrene.

3. The process as claimed in claim 1 wherein at least part of the alkenyl aromatic hydrocarbon is α-methyl styrene.

4. The process as claimed in claim 1 wherein the alkenyl aromatic hydrocarbon is a mixture of styrene and α-methyl styrene.

5. The process as claimed in claim 1 wherein the stabilizing compound is oxalic acid.

6. The process as claimed in claim 1 wherein the stabilizing compound is formic acid.

7. The process as claimed in claim 1 wherein the stabilizing compound is glyoxylic acid.

References Cited in the file of this patent

UNITED STATES PATENTS

| | | |
|---|---|---|
| 2,100,900 | Fikentscher | Nov. 30, 1937 |
| 2,367,810 | Turkington et al. | Jan. 23, 1945 |
| 2,460,692 | Gould | Feb. 1, 1949 |
| 2,503,244 | Coover et al. | Apr. 11, 1950 |
| 2,503,245 | Coover et al. | Apr. 11, 1950 |
| 2,600,783 | Kropa | June 17, 1952 |
| 2,646,423 | Wehr et al. | July 21, 1953 |

FOREIGN PATENTS

| | | |
|---|---|---|
| 590,247 | Great Britain | July 11, 1947 |